Jan. 21, 1958   O. E. ANDRUS   2,820,286
METHOD OF MAKING COMPOSITE PLATES
Filed Sept. 1, 1951

INVENTOR.
Orrin E. Andrus
BY Andrus & Sceales
ATTORNEYS.

United States Patent Office 2,820,286
Patented Jan. 21, 1958

2,820,286

METHOD OF MAKING COMPOSITE PLATES

Orrin E. Andrus, Milwaukee, Wis., assignor to A. O. Smith Corporation, Milwaukee, Wis., a corporation of New York Application September 1, 1951, Serial No. 244,850

3 Claims. (Cl. 29—471.5)

This invention relates to a method of making composite metal articles, and particularly to the bonding of a liner sheet to a base plate in order to produce a corrosion and contamination resistant product.

An object of the invention is to provide a method of manufacturing composite plates wherein the step of rolling or otherwise working the heated members is eliminated, so that there is no reduction in the thickness of the finished plate and no adverse effect on the properties of the liner metal.

Another object is to provide a uniform and continuous high-strength bond between a pair of heated plates without the necessity of employing relatively expensive machines such as rolls and presses.

Another object of the invention is to create a pressure bond between a liner sheet and a base plate by bending the liner sheet into pressure conformity with the irregularities and depressions normally present in a base plate, as distinguished from deforming the members until the depressions are filled.

A further object is to provide a bonding method wherein the step of placing a separating material between abutting corrosion resistant members may be eliminated, and wherein the bonds between facing members and corresponding base members may be effected through either welding or brazing.

The method, in general, comprises placing a facing member in flatwise engagement with a base member, heating corresponding portions of the facing and base members to a bonding temperature, and applying relatively high fluid pressure in a direction to force the members into pressure contact and create the bond. More particularly, the method consists of forming a stack of two liner members and two base members disposed outwardly thereof, sealing the edges of the liner and base members as by fusion welding, furnace heating the entire stack to a bonding temperature, and injecting fluid under high pressure into the chamber between the liner members to press them outwardly into continuous intimate contact with the corresponding base members. To complete the process, the composite plates are removed from the holding fixture therefor and the edges are trimmed as by gas cutting either before or after the cooling operation.

Other objects and advantages will be set forth more fully in the following description of an embodiment of the invention illustrated in the accompanying drawings.

The method of the invention is illustrated as employed in the manufacture of a composite metal plate such as is formed through the union of a relatively strong and inexpensive backing member or base plate 1 with a relatively expensive facing member or liner sheet 2. The backing member 1 is normally made of carbon steel whereas the liner sheet 2 may be of any suitable metal, for example stainless steel, nickel or silver. For most applications the purpose of the liner 2 is to protect the base metal from the corrosive effects of fluids contained within digesters, cracking towers, or other vessels which may be fabricated from the composite plates after the same have been rolled or otherwise formed into the desired shape. Because of the strength and cost characteristics of the components of the composite plates, the liner sheet 2 is usually much thinner than the base member to which it is bonded.

Figure 1:
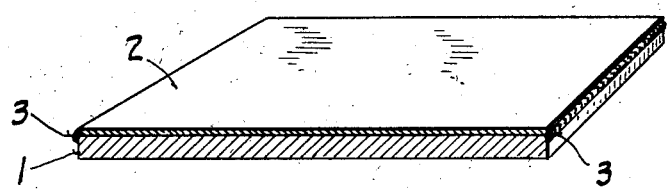
Figure 1 is a perspective view showing a liner sheet as welded to a base plate preparatory to the bonding operation.

Referring to the drawings, the corrodible base plate 1 and the relatively thin corrosion resistant liner sheet 2 are first thoroughly cleaned and otherwise prepared and then arranged flatwise in what may be termed a preliminary assembly. The members 1 and 2, which are of substantially the same size and shape, are preferably next joined at their peripheral edges as by making the arc weld 3 illustrated in Fig. 1.

In preparing the members 1 and 2 for the making of the described assembly, it is frequently desirable to take steps adapted to enhance the bond therebetween. For example, nickel may be plated on either or both of the members or interposed in sheet form. It may also be desired to plate iron on at least one interface for improved welding action.

Where the bond is to be created by high temperature brazing instead of by welding, a suitable brazing compound is provided between the members. A preferred compound consists of an alloy of chromium, nickel, boron, iron, silicon and carbon, and is commercially obtainable under the trade-mark "Nicrobraze."

Various steps should be taken, either before or after the preliminary assembly is made, to prevent the interfaces from scaling and oxidizing. One such step is to draw a vacuum on the space between the assembled parts, while an alternative step is to introduce an inert or reducing gas into said space.

It may be necessary, especially where a material such as carbon is employed as a reducing agent, to vent the space between the assembled members 1 and 2 in order to prevent the building up of excessive gas pressures when the assembly is heated. The size of the vent is chosen to permit escape of a sufficient amount of expanding gas while preventing ingress of harmful furnace gasses and particles of dirt.

Figure 2:
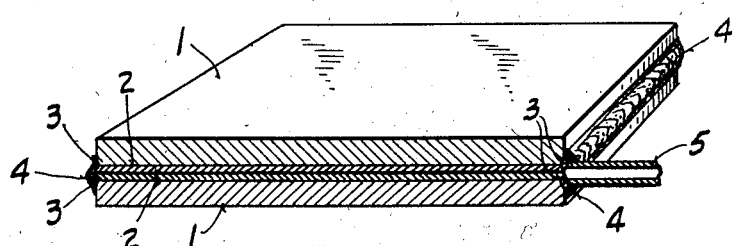
Fig. 2 illustrates the welding of two of the assemblies of Figure 1 into a stack or sandwich.
Figure 3:
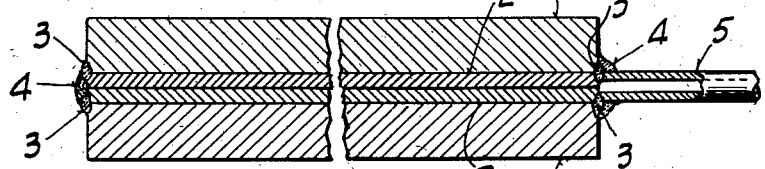
Fig. 3 is an enlarged cross sectional view of the showing of Fig. 2.

As the next operation in the method of the invention, two of the described preliminary assemblies are sandwiched into a stack or pack, with corresponding liner sheets 2 being preferably in flatwise engagement as shown in Fig. 2. The edges of the stack are then sealed, for instance by making an arc or other fusion weld 4 which merges with the edge welds 3 previously mentioned.

The purpose of sealing the edges of the stack is to create, between the opposed liner sheets 2, a chamber adapted to receive pressure fluid through one or more nozzles 5 which are welded in place during the making of the weld 4. The inner end of the nozzle 5 is disposed adjacent the meeting edges of the liner sheets, so that the pressure fluid is injected between the sheets while being prevented by the welds 3 from leaking into the spaces between the liner sheets 2 and corresponding base plates 1.

Where the coefficients of expansion of the base plates and liner sheets are greatly different, the pack is formed in a manner, not shown, adapted to permit relative sliding of said members upon heating. Such a result may be obtained by providing the edge welds 3 along only one edge of the pack, whereas the weld 4 is made completely around the pack between opposed liner sheets in order to form the fluid chamber. In this construction the nozzle 5 is at the edge of the pack which is sealed by both the weld 4 and welds 3, and means are preferably provided to sealingly connect the base plates along the remaining three edges of the pack to permit the evacuation of the spaces between the respective liner sheets and base plates.

In order to prevent rupture of the welds 3 and 4 or the nozzle 5 when the pressure fluid is applied, the nozzle and the welds are relatively thick and are composed of suitable metals having sufficient high temperature strength to withstand furnace temperatures. This requirement is particularly important where the bond is to be effected through welding as distinguished from a relatively low temperature brazing operation made possible by the use of a suitable brazing material between the respective members.

The stack having been prepared for the insertion of pressure fluid, the next step in the method comprises heating the interfaces of the respective liner sheets 2 and base plates 1 to a brazing or welding temperature, depending upon the type of bond which is to be made. This is accomplished by disposing the stack of Fig. 2 in a furnace and raising the temperature of all of the component sheets and plates until the desired temperature is reached.

In a brazing operation, the bonding temperature is approximately the same as the melting point of the brazing material. The temperature for a welding operation, on the other hand, is below the melting point of any of the components of the pack and is attained when the base plates and liner sheets are in a plastic state. For example, in welding a liner to a carbon steel base plate the bonding temperature is normally in the range of 2,000° F. to 2,400° F.

Figure 4:
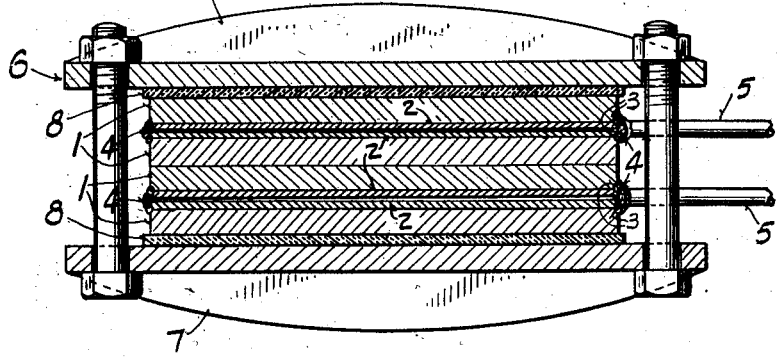
Fig. 4 is a cross sectional view showing two such stacks in the insulated holding frame therefor.

After heating, one or more of the stacks are removed from the furnace and arranged in a very strong backing frame or holding fixture 6 having strengthening ribs 7. Referring to Fig. 4, two stacks are shown as disposed in a single frame, with base plates 1 of each stack either engaging each other or being spaced by a suitable separating material.

The frame 6 is preferably provided with upper and lower heat insulating portions 8 with which the upper and lower base plates 1 of the stacks are engaged. The portions 8 are substantially incompressible and serve to prevent excessive heat loss from the stacks after the same are removed from the furnace.

According to the invention, fluid under high pressure is next inserted through the nozzles 5 into the chambers between opposed liner sheets 2 to increase the size thereof. Since movement of the various base plates 1 is resisted by the holding fixture 6, the increase in the size of the fluid chambers forces the liners 2 into continuous intimate pressure contact with the corresponding base plates 1.

In welding a liner to carbon steel at the temperatures previously set forth, a representative fluid pressure would be in the vicinity of 4,000 pounds per square inch. As the thickness of the liner sheet is increased beyond an eighth or a quarter of an inch, the amount of the fluid pressure should be proportionately raised in order to provide the requisite pressure contact.

The fluid may comprise air, nitrogen, steam, molten salt, or other material adapted to withstand the temperatures to which the stacks are raised. Any suitable pressure system may be employed and connected through pipes, not shown, to the nozzles 5.

The duration of the interval of pressure application is governed by the type of bond being made. Where a braze is employed, the pressure is maintained during at least the first stages of cooling of the pack in order to permit the braze to solidify. In welding, on the other hand, the interval of pressure application may be considerably shorter.

Figure 5:
Fig. 5 is a perspective view of a completed and trimmed composite plate.

After release of the fluid pressure, the composite plates are removed from the fixture 6. The edges may then be trimmed as by gas cutting the same either before or after the plates have cooled, thereby forming the finished composite plate illustrated in Fig. 5.

To fully understand the method of the invention it must be appreciated that base plates employed in the mass production of composite articles are normally not flat and smooth but instead are relatively uneven and characterized by the presence of depressions and bulges. Thus when the bonding pressure is applied by rolling, the straight line contact between the rolls and the plates makes it necessary to deform the plates in order to fill in the depressions. Similarly, the flat rigid platen of a press must be applied with enormous pressures and the plate metal must be deformed before continuous contact between liner and base plate results. Due to the deformation of the metal where rolls and presses are employed, the lining is not of uniform thickness and consequently the precise corrosion resistant properties thereof may not be determined with certainty.

Under the invention, the lining is bent into conformity with the contours of the base plate through the application of a uniform fluid pressure as distinguished from the non-uniform rigid pressure effected by rolls and presses. Since the fluid pressure bends the liner instead of deforming it, the thickness of the liner is maintained uniform throughout.

The method permits the manufacture of composite plates with no adverse effect on the metallurgical properties of the liner sheet due to extensive hot working thereof after bonding. Because of the fact that the stacks are heated and then placed in the heat insulated frame, heating of the frame is rendered unnecessary and the frame is consequently not weakened or otherwise adversely affected.

Various embodiments of the invention may be employed within the scope of the following claims.

I claim:

1. A method of manufacturing composite metal plates utilizing pressure, which comprises forming a pack of two contiguously disposed liner sheets and two base plates arranged outwardly of said liner sheets, sealing the peripheral edges of the pack to create a structure having a substantially fluid-tight chamber between the liner sheets and whereby said structure is capable of withstanding the pressure utilized, heating the pack to a temperature commensurate with the fusion bonding temperature of the metals involved, injecting fluid under pressure into said chamber while holding the base plates against outward movement and with said pressure being of an order to thereby force the respective liner sheets into continuous pressure contact with the corresponding base plates and thus effect strong and permanent bonds therebetween, and maintaining the pressure in said chamber until the pack has cooled below said bonding temperature.

2. In a method of manufacturing composite metal plates, the steps of forming a stack of two contiguously disposed liner sheets and two carbon steel base plates arranged outwardly of said liner sheets, said members having substantially the same planar dimensions, welding the peripheral edges of said stack to form a substantially fluid-tight chamber between said liner sheets and between the liner sheets and the corresponding base plates, furnace heating said stack to a temperature commensurate with the fusion bonding temperature of the metals involved, thereafter disposing the stack in a strong frame adapted to hold said base plates against outward movement, injecting fluid under high pressure into said chamber to bend the respective liner sheets into continuous pressure contact with the corresponding base plates, and maintaining said pressure fluid in said chamber until the stack has cooled below said bonding temperature.

3. A method of manufacturing composite metal plates, which comprises the steps of welding, respectively, the peripheral edges of a pair of relatively thin corrosion resistant liner sheets to the peripheral edges of a corresponding pair of carbon steel base plates disposed in flatwise engagement therewith, placing the assemblies thus formed in contiguous flatwise relation with the liner sheets adjacent each other, fusion welding the peripheral edges of said assemblies together to form a fluid-tight chamber between said liner sheets, placing the pack thus formed in a furnace and heating the same to a temperature commensurate with the pressure welding temperature of the metals involved, removing said pack from the furnace and placing the same in a strong heat insulating frame adapted to hold the base plates against outward movement, injecting fluid under high pressure into said chamber to force the respective liner sheets outwardly into continuous pressure contact with the corresponding base plates, and maintaining said fluid under pressure within said chamber during at least the first stages of cooling of said members to complete strong and permanent bonds between corresponding liner sheets and base plates.

References Cited in the file of this patent

UNITED STATES PATENTS

| | | |
|---|---|---|
| 98,537 | Absterdam | Jan. 4, 1870 |
| 895,412 | Badger | Aug. 11, 1907 |
| 942,184 | Persons | Dec. 7, 1909 |
| 1,152,610 | De Bats | Sept. 7, 1915 |
| 1,886,615 | Johnson | Nov. 8, 1932 |
| 1,956,818 | Acre | May 1, 1934 |
| 2,023,354 | Cope | Dec. 3, 1935 |
| 2,147,407 | Huston | Feb. 14, 1939 |
| 2,160,558 | Orr | May 30, 1939 |
| 2,169,354 | Chace | Aug. 15, 1939 |
| 2,228,139 | Leonhardy | Jan. 7, 1941 |
| 2,366,164 | Weick et al. | Jan. 2, 1945 |
| 2,438,759 | Liebowitz | Mar. 30, 1948 |
| 2,468,206 | Keene | Apr. 26, 1949 |
| 2,473,712 | Kinney | June 21, 1949 |
| 2,713,196 | Brown | July 19, 1955 |